(12) United States Patent
Schinkelwitz

(10) Patent No.: US 8,229,895 B2
(45) Date of Patent: Jul. 24, 2012

(54) PRESERVATION MANAGEMENT OF DIGITAL CONTENT

(75) Inventor: Bruce Schinkelwitz, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 11/970,862

(22) Filed: Jan. 8, 2008

(65) Prior Publication Data

US 2009/0177708 A1    Jul. 9, 2009

(51) Int. Cl.
*G06F 17/30* (2006.01)
*G06F 7/00* (2006.01)

(52) U.S. Cl. ........................ 707/661; 707/802

(58) Field of Classification Search .......... 707/204, 707/661, 802
See application file for complete search history.

(56) References Cited

U.S. PATENT DOCUMENTS

| | | | |
|---|---|---|---|
| 5,379,423 A | 1/1995 | Mutoh et al. | |
| 6,560,616 B1 * | 5/2003 | Garber | 1/1 |
| 7,092,977 B2 * | 8/2006 | Leung et al. | 1/1 |
| 7,233,959 B2 | 6/2007 | Kanellos et al. | |
| 2005/0203964 A1 | 9/2005 | Matsunami et al. | |
| 2007/0136397 A1 | 6/2007 | Pragada et al. | |
| 2007/0185915 A1 | 8/2007 | Prahlad et al. | |
| 2007/0185934 A1 | 8/2007 | Cannon et al. | |

OTHER PUBLICATIONS

HPILM: "Information Lifecycle Management technique overview", 5982-3398EN, Jan. 2004.*
LEGATO Information Lifecycle Management Solutions on the Microsoft Windows Server™, Microsoft, 2003.*
http://en.wikipedia.org/wiki/Information_Lifecycle_Management <retrieved on Dec. 27, 2007>.

* cited by examiner

*Primary Examiner* — Kuen Lu
(74) *Attorney, Agent, or Firm* — Mollborn Patents, Inc.; Fredrik Mollborn

(57) ABSTRACT

Methods and apparatus, including computer program products, implementing and using techniques for configuring a life-cycle for preservation of digital content. Metadata associated with a digital object that is to be stored in a repository is examined. One or more preservation rules for the digital object are identified, based on the metadata for the digital object. The preservation rules describe a set of future actions to be taken on the digital object to ensure preservation of the digital object throughout the digital object's life-cycle. The identified preservation rules are applied to the digital object. The digital object is stored in the repository.

22 Claims, 3 Drawing Sheets

PRESERVATION MANAGEMENT OF DIGITAL CONTENT

BACKGROUND

This invention relates to information lifecycle management (ILM). ILM refers to the practice of applying certain policies to the effective management of information throughout its useful life. For digital content, the lifecycle typically starts with initial capture and ends with eventual purge from the storage media where the digital content resides.

Typically, five phases identified as being part of the lifecycle continuum: Creation and Receipt, Distribution, Use, Maintenance, and Disposition. Creation and Receipt deals with information items from their point of origination, such as creation by a user or receipt from an external source. Distribution is the process of managing the information items once they have been created or received. Use takes place after the information items have been distributed. Maintenance refers to the management of the information items, such as filing, retrieving, or transferring the information items. Disposition is the practice of handling information items that are less frequently accessed or that have met their assigned retention periods.

The various phases of the ILM are governed by various laws and regulations, IT (Information Technology) policies, and business practices, based on the type and format of the digital content. Typically, the ILM is a semi-automated process in which some operations are done automatically by the systems on which the digital content is stored, whereas other operations require decisions and inputs by a human user.

Long-term storage of digital content is becoming an increasingly relevant problem, as newer versions of software applications may not support older formats of digital content. Policies and regulations may dictate that the digital content be stored for periods of 25 years or longer, or even "permanently." It is relatively easy to achieve long-term or permanent storage with paper document or microfilm based information. Digital records, on the other hand, must be periodically "refreshed" to ensure that the format in which the records are generated or captured in remains viable and that the media on which the digital content is stored remains accessible, as various software upgrades typically are made every few years. There are currently no fully automated lifecycle processes that manage the digital content end-to-end, from the content inception to end of its life for short-term and long-term storage.

SUMMARY

In general, in one aspect, the invention provides methods and apparatus, including computer program products, implementing and using techniques for configuring a life-cycle for preservation of digital content. Metadata associated with a digital object that is to be stored in a repository is examined. One or more preservation rules for the digital object are identified, based on the metadata for the digital object. The preservation rules describe a set of future actions to be taken on the digital object to ensure preservation of the digital object throughout the digital object's life-cycle. The identified preservation rules are applied to the digital object. The digital object is stored in the repository.

Advantageous implementations can include one or more of the following features. Examining metadata can include identifying a data type for the digital object. A set of preservation rules can be associated with each data type. The preservation rules can include technology rules describing content preservation system actions on the digital object for life-cycle preservation, and/or human rules describing human organizational management actions on the digital object for life-cycle preservation. Identifying one or more preservation rules can include receiving a user input defining the one or more preservation rules for the digital object. Identifying one or more preservation rules can include receiving pre-defined set of one or more recommended preservation rules for the digital object. The preservation rules for the digital object can be shared with a records management system containing information for the digital object. The preservation rules can be defined at least in part based on an application that was used to create the digital object. A maintenance alert can be generated based on the preservation rules applied to the digital object. A user input describing further properties of the digital object can be received and preservation rules can be identified at least in part based on the received user input.

The invention can be implemented to include one or more of the following advantages. Digital content can be automatically managed from its inception until it is finally disposed of. This provides immediate value to corporations and other organizations that have to comply with long-term content and records retention requirements. The management of content at any stage of the content life-cycle is streamlined as the preservation or content storage rules and policies for any phase in the content life-cycle can be pre-configured and documented, and be driven by the events and processes at the storage and content tiers.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various embodiments of the invention described herein pertain to preservation management of digital content. In particular, a preservation management tool makes it possible to define and configure preservation management rules for classes or sub-classes of digital content. The various embodiments of the preservation management tool support automatic detection of content type or format of digital content and associates preservation management rules based on that detection. The preservation management rules apply throughout the lifecycle of the digital content, from initial capture or creation of the digital content to final disposition of the digital content. Various embodiments of the invention will now be described by way of example and with reference to the drawings.

Figure 1:
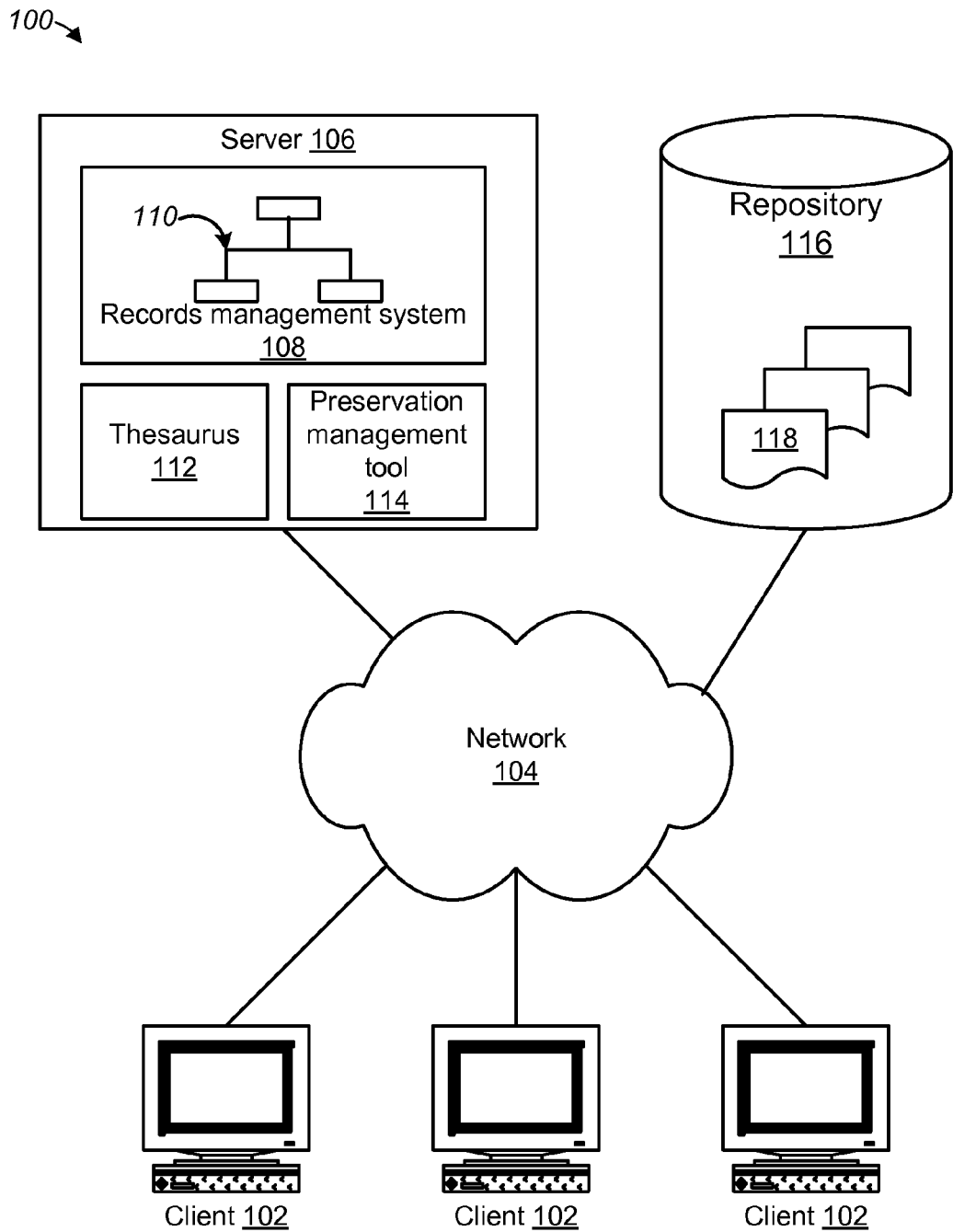
FIG. 1 shows an overview of a system (100) in which a preservation management tool in accordance with one embodiment of the invention can be implemented.

FIG. 1 shows an overview of a system (100) in which a preservation management tool in accordance with one embodiment of the invention can be implemented. As can be seen in FIG. 1, the system (100) includes several clients (102) that can access a records management system (108) residing on a server (106) through a network (104), such as a company's intranet, or the Internet, using conventional techniques. The records management system (108) includes, among other things, a hierarchical organization or the records (110). The records (110) in the records management system (108) contain information about digital content, such as documents (118), stored in a repository (116). The documents (118) in the repository (116) can be accessed by the clients (102) and server (106) applications through the network (104). It should also be noted that although only a single repository (116) is illustrated in FIG. 1, in a real life scenario, there can be several repositories (116) that are connected to the network (104).

The server (106) also includes a thesaurus (112), which includes a list of authorized terms to be used for functional headings, file titles and/or indexing terms for the records management system (108). Finally, the server (106) also includes a preservation management tool (114), which can be used to define and configure preservation management rules for classes or sub-classes of digital content, such as the digital documents (118). The preservation management tool (114) can interface with or pass instructions to storage software of both backup solutions and other storage technologies for the repository (116), in order to provide rules regarding the transition of the content as part of the content preservation lifecycle. In some embodiments, the preservation management tool (114) can also interact with the records management system (108) to provide enhance functionality for the system (100). Various aspects of the preservation management tool (114) will now be described in further detail with reference to FIGS. 2 and 3.

Figure 2:
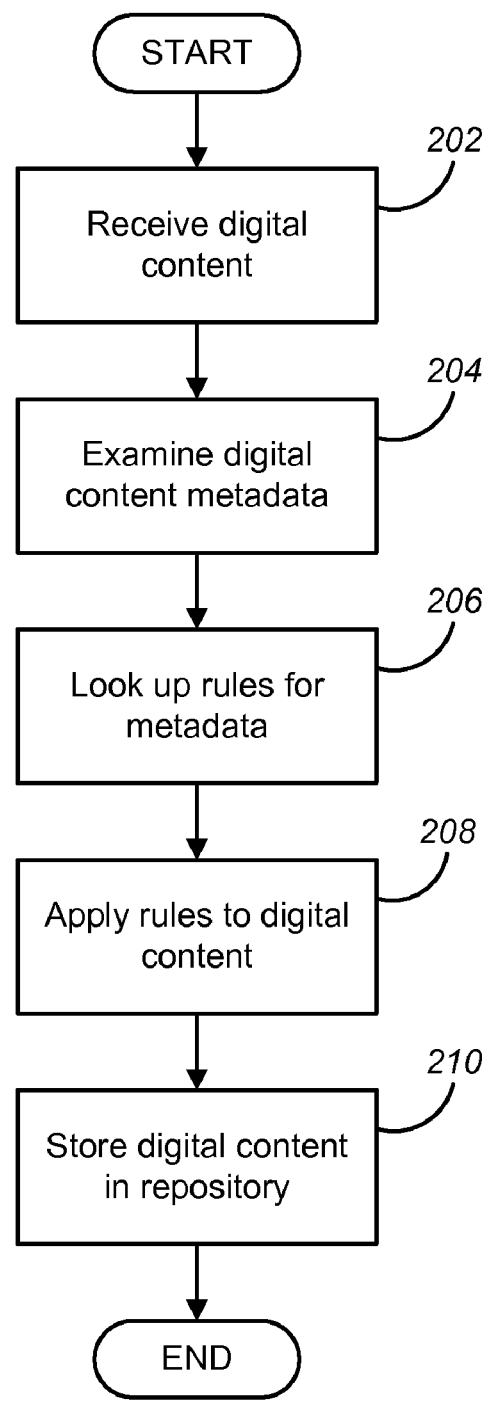
FIG. 2 shows a process (200) for how content can be received and stored in the system (100) of FIG. 1, in accordance with one embodiment of the invention.

FIG. 2 shows a process (200) for how content can be received and stored in the system (100) of FIG. 1 in accordance with one embodiment of the invention. As can be seen in FIG. 2, the process (200) starts by receiving digital content (step 202). The receipt can include content being generated in the system (100), for example, by a user, or the digital content can be received from an external source, for example, in the form of an email, an electronic document, or an audio or video file.

Next, metadata associated with the digital content is examined (step 204). The metadata can be described as extra data associated with the content that typically describes the content type or format. For example, a Microsoft Word™ document (hereinafter MS Word) with the file extension .DOC typically has associated metadata that describes the version of MS Word in which the document was generated, the date the document was generated, the author of the document, and so on. Optionally, in some embodiments the user can also enter further data pertaining to the nature of the digital content, for example, additional information regarding the format, versions, processing rules, host systems, and so on.

Once the digital content has been classified by reading the metadata and receiving any further descriptive user input, the rules for the type of digital content are looked up (step 206). These rules are typically handling rules for particular types of object. In some embodiments, the rules can be pre-configured by a user of the system (100). In other embodiments the rules can be imported from an external system. In yet other embodiments, there may be a combination of user-configured and imported rules. Typically, the rules are configured based on the object type (e.g., Microsoft Office™ file types, Portable Document Format (PDF) files, form data, Extensible Meta Language (XML) files, and so on) and determine how the digital content will be stored as the digital content ages, including instructions for content migration to standard or open formats and instructions for when and how the digital content should be accessed and refreshed. This will be described in further detail below with reference to FIG. 3. As was described above, the rules directing the preservation requirements for the digital content can be based upon rules of law and on regulations, configurable IT policies of the user organization, as well as configurable 'best practices' based upon the formats of the digital content in question.

In some embodiments, the rules are stored in a local database of the preservation management tool (114). However, as the skilled reader realizes, the rules (and in some implementations, even the preservation management tool (114) itself) can also be stored elsewhere in the system (100), or even in a remote location where the rules can be accessed over a network, such as the Internet. In some embodiments, rule packages can be downloaded from various providers and installed in the preservation management tool (114), in order to facilitate the implementation of "recommended practices" for different categories of digital content Next, the identified rules are applied to the digital content (step 208), based on the object class for the digital content. In some embodiments, the rules are applied as additional metadata to the digital content. In other embodiments, the rules are applied by adding properties to one or more records (110) in the records management system (108) that correspond to the digital content. The digital content can then be managed from the records management system (108), similar to how conventional records (110) are managed. The rules provide the necessary data for storage system handling of the digital content as the digital content is passed from one management phase to the next. In some embodiments, applying the rules can also include migrating the digital content to standard preservation formats, such as PDF/A format, ASCII format, and so on. Finally, the digital content is stored in the repository (116) in accordance with the applied rules. This ends the process (200).

Figure 3:
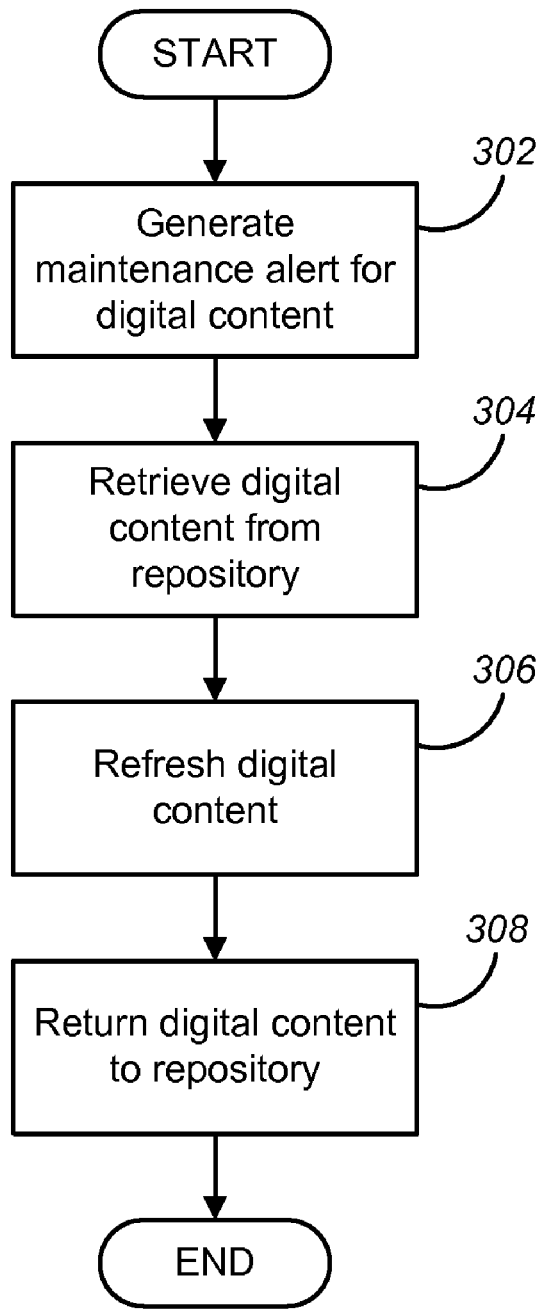
FIG. 3 shows a process (300) for how digital content can be periodically refreshed, in accordance with one embodiment of the invention.

FIG. 3 shows a process (300) for how digital content can be periodically refreshed, in accordance with one embodiment of the invention. As can be seen in FIG. 3, the process (300) starts with generating a maintenance alert for digital content (step 302). The maintenance alert is typically generated based on the rules that are associated with the digital content. For example, the rules may state that a MS Word 95 document should be refreshed every two years. Thus, when two years have passed from the creation or ingestion of the document into the system (100), a maintenance alert will be triggered. The maintenance alert can be displayed to a user through various conventional mechanisms, such email notifications, SMS, or on-screen dialog boxes, and so on, which are all well-known to those of ordinary skill in the art.

Next, the digital content for which the maintenance alert was generated is located and retrieved from the repository (116) (step 304). Depending on the configuration of the system (100), the retrieval can either be completely automatic by the preservation management tool (114) or can be done manually by a user, for example, in response to the user receiving a communication with the maintenance alert generated in step 302.

The digital content is then refreshed in accordance with the rules (step 306), either by the system (100) itself, or through some input or other action on the content by the user, depending on the system configuration. In the above example of the MS Word 95 document, the refreshing can include updating the document to a newer version of MS Word, such as MS Word 97. However, the refreshing can also include converting the digital content into a different format that is better suited for archiving purposes, or for whatever the subsequent phase in the content lifecycle might be. For example, the MS Word document can be converted into a PDF document to prevent edits from being made, or be converted into an archiving format that requires little storage space.

Finally, the refreshed digital content is returned to the repository (116) (step 308). It should be noted, that the digital content does not have to be returned to the same physical location, that is, repository (116), from which the digital content was retrieved for the refreshing operation. The digital content can, for example, be moved to a different repository that is better suited for long-term archiving, or the digital content can even be completely disposed of if the digital content has reached the end of the content lifecycle.

In some embodiments where both a preservation management tool (114) and a records management system (108) are used, the preservation management tool (114) and the records management system (108) can exchange information, and thereby eliminate the need for redundant operations. For example, if the digital content is only supposed to be kept for one year according to the policies specified in the records management system (108), then the preservation management tool (114) would not generate a maintenance alert five years later for the non-existing content. In some embodiments, the records management system (108) can incorporate the preservation management rules as part of the normal retention operations for the records management system (108). This allows the records management system (108) to invoke a current preservation method at any point during a longer term retention, without both the preservation tool (114) and records management system (108) both carrying out operations independently.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electric, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the refreshing of the digital content was described above as being done in response to a maintenance alert being generated, but other options are also possible. For example, a user query the preservation management tool (114) to find out what digital content will need to be refreshed during a specified time period and perform the refreshing in a "batch mode" for multiple pieces of digital content, instead of on an item-by-item basis. Accordingly, other embodiments are within the scope of the following claims.

The invention claimed is:

1. A computer-implemented method for configuring a lifecycle for preservation of digital content, the method comprising:
    examining metadata associated with a digital object that is to be stored in a repository;
    identifying one or more preservation rules for the digital object based on the metadata for the digital object, the preservation rules describing a set of future actions to be taken on the digital object to ensure preservation of the digital object throughout the digital object's life-cycle;
    applying the identified preservation rules to the digital object;
    storing the digital object and the applied preservation rules in the repository;
    generating a maintenance alert based on the preservation rules applied to the digital object; and
    in response to the maintenance alert, performing the following actions on the digital object:
    retrieving the digital object from the repository;
    refreshing the digital object in accordance with the applied preservation rules; and
    returning the digital object to the repository.

2. The method of claim 1, wherein examining metadata includes:
    identifying a data type for the digital object.

3. The method of claim 2, wherein a set of preservation rules is associated with each data type.

4. The method of claim 1, wherein the preservation rules include one or more of: technology rules describing content preservation system actions on the digital object for life-cycle preservation, and human rules describing human organizational management actions on the digital object for life-cycle preservation.

5. The method of claim 1, wherein identifying one or more preservation rules includes receiving a user input defining the one or more preservation rules for the digital object.

6. The method of claim 1, wherein identifying one or more preservation rules includes receiving pre-defined set of one or more recommended preservation rules for the digital object.

7. The method of claim 1, further comprising:
    sharing the preservation rules for the digital object with a records management system containing information for the digital object.

8. The method of claim 1, wherein the preservation rules are defined at least in part based on an application that was used to create the digital object.

9. The method of claim 1, further comprising:
receiving a user input describing further properties of the digital object; and
identifying preservation rules at least in part based on the received user input.

10. A computer program product for configuring a life-cycle for preservation of digital content, the computer program product comprising:
a computer readable storage medium having computer readable program code embodied therewith, the computer readable program code comprising:
computer readable program code configured to examine metadata associated with a digital object that is to be stored in a repository;
computer readable program code configured to identify one or more preservation rules for the digital object based on the metadata for the digital object, the preservation rules describing a set of future actions to be taken on the digital object to ensure preservation of the digital object throughout the digital object's life-cycle;
computer readable program code configured to apply the identified preservation rules to the digital object;
computer readable program code configured to store the digital object and the applied preservation rules in the repository;
computer readable program code configured to generate a maintenance alert based on the preservation rules applied to the digital object; and
computer readable program code configured to in response to the maintenance alert, perform the following actions on the digital object:
retrieving the digital object from the repository;
refreshing the digital object in accordance with the applied preservation rules; and
returning the digital object to the repository.

11. The computer program product of claim 10, wherein the computer readable program code configured to examine metadata includes:
computer readable program code configured to identify a data type for the digital object.

12. The computer program product of claim 11, wherein a set of preservation rules is associated with each data type.

13. The computer program product of claim 10, wherein the preservation rules include one or more of: technology rules describing content preservation system actions on the digital object for life-cycle preservation, and human rules describing human organizational management actions on the digital object for life-cycle preservation.

14. The computer program product of claim 10, wherein the computer readable program code configured to identify one or more preservation rules includes computer readable program code configured to receive a user input defining the one or more preservation rules for the digital object.

15. The computer program product of claim 10, wherein the computer readable program code configured to identify one or more preservation rules includes computer readable program code configured to receive a pre-defined set of one or more recommended preservation rules for the digital object.

16. The computer program product of claim 10, further comprising:
computer readable program code configured to share the preservation rules for the digital object with a records management system containing information for the digital object.

17. The computer program product of claim 10, wherein the preservation rules are defined at least in part based on an application that was used to create the digital object.

18. The computer program product of claim 10, further comprising:
computer readable program code configured to receive a user input describing further properties of the digital object; and
computer readable program code configured to identify preservation rules at least in part based on the received user input.

19. A system for configuring a life-cycle for preservation of digital content, comprising:
a repository operable to store a plurality of digital objects; and
a server operable to communicate with the repository through a network, wherein the server includes a preservation management tool operable to:
examine metadata associated with a digital object that is to be stored in a repository;
identify one or more preservation rules for the digital object based on the metadata for the digital object, the preservation rules describing a set of future actions to be taken on the digital object to ensure preservation of the digital object throughout the digital object's life-cycle;
apply the identified preservation rules to the digital object;
store the digital object and the applied preservation rules in the repository;
generate a maintenance alert based on the preservation rules applied to the digital object; and
in response to the maintenance alert, perform the following actions on the digital object:
retrieve the digital object from the repository;
refresh the digital object in accordance with the applied preservation rules; and
return the digital object to the repository.

20. The system of claim 19, wherein the preservation management tool is operable to examine metadata by identifying a data type for the digital object.

21. The system of claim 20, wherein a set of preservation rules is associated with each data type.

22. The system of claim 19, wherein the preservation management tool is further operable to share the preservation rules for the digital object with a records management system containing information for the digital object.

* * * * *